Patented Dec. 26, 1950

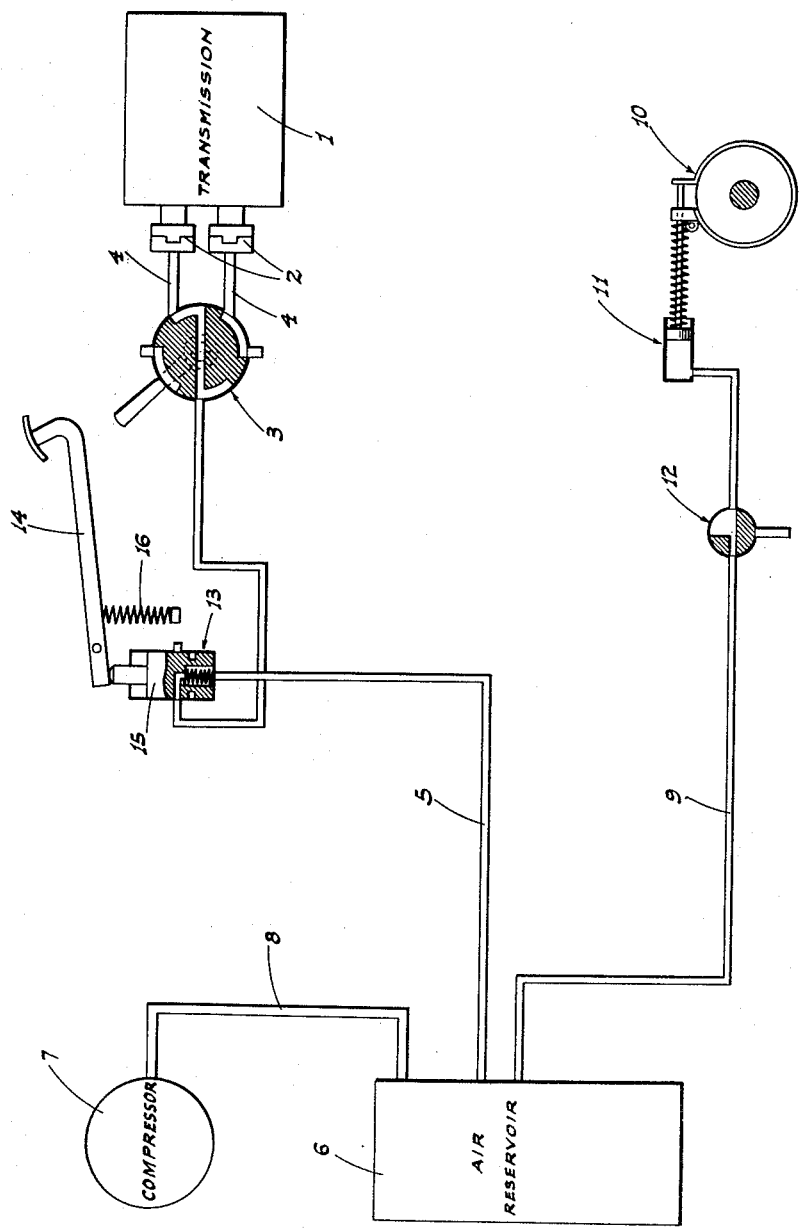

2,535,300

UNITED STATES PATENT OFFICE 2,535,300

FLUID PRESSURE CONTROL SYSTEM FOR VEHICLES

Robert G. Le Tourneau, Longview, Tex., assignor to R. G. Le Tourneau, Inc., Stockton, Calif., a corporation of California Application July 6, 1948, Serial No. 37,283

6 Claims. (Cl. 192—13)

This invention is directed to, and it is an object to provide, a novel fluid pressure control system for the transmission of a vehicle, wherein the transmission includes a fluid pressure controlled clutch assembly.

Another object of the invention is to provide a fluid pressure control system, as above, which includes one valve, preferably hand actuated, adapted to effect speed changes, or reversal of the direction of travel, of the vehicle; there being another valve, preferably foot actuated, in the system between said one valve and the source of pressure supply, so that opening of said other valve accomplishes effective declutching of the transmission. This facilitates control of the transmission, as it permits said one valve to be set to a new position without pressure working therethrough to the clutches at the same time. Additionally, fluid pressure can be supplied to any selected clutch gradually, assuring of easy engagement of the same, and consequent smooth operation of the vehicle.

A further object of the invention is to provide said other valve, as in the preceding paragraph, to act as a block against sudden pressure reduction in the fluid pressure reservoir occasioned, otherwise, by a change of the clutches in operation; this being of especial advantage on a vehicle having another device, such as a spring engaged, but normally fluid pressure released parking brake, which normally requires a certain pressure from the reservoir to maintain a given operating condition.

It is also an object of the invention to provide a fluid pressure control system, for a transmission having fluid pressure controlled clutches, which permits of more flexible use of the vehicle in the sense that the driver has direct and ready control of the vehicle independent of the clutch changing valve.

A further object of the invention is to provide a practical and reliable fluid pressure control system for vehicles, and one which will be exceedingly effective for the purpose for which it is designed.

These objects are accomplished by means of such structure and relative arrangement of parts as will fully appear by a perusal of the following specification and claims.

The figure of the drawing is a diagrammatic illustration of the fluid pressure control system for vehicles.

Referring now more particularly to the characters of reference on the drawing, the numeral 1 indicates a vehicle transmission which may be of constant mesh type, and which includes a plurality of clutches 2; such clutches being for the purpose of changing speed or direction of travel. While the drawing illustrates only two clutches, there are in actual practice a substantially greater number.

The clutches 2 are of a type which is fluid pressure engaged; there being internal springs which release each clutch upon the fluid pressure being relieved therefrom.

The numeral 3 indicates a four-way valve, preferably hand actuated and disposed within reach of the operator of the vehicle; such valve being arranged to deliver fluid under pressure selectively through corresponding conduits 4. Fluid pressure is fed to the input of the valve 3 by means of a conduit 5 which leads from a fluid pressure reservoir 6, which reservoir derives fluid pressure from a compressor 7 through the medium of a conduit 8.

In the system there is another pressure feed conduit 9 which leads from the reservoir 6 to a spring engaged brake unit 10 which is normally disengaged by means of a fluid pressure actuated power cylinder 11 connected to the conduit 9. The brake unit 10 may be, for example, the parking brake of the vehicle, which thus necessarily is normally disengaged. The pressure feed conduit 9 has a normally open two-way valve 12 interposed therein so that pressure is maintained, while the vehicle is in operation, in the power cylinder 11 to disengage the brake unit 10. To engage such brake unit, the valve 12 is turned to a position to exhaust the cylinder 11 whereby said brake unit 10 is set by the springs included therein.

It has been found in the operation of a fluid pressure control system, as above described, that upon manipulation of the valve 3 to change clutches 2, the pressure drop in the reservoir 6 is such that the power cylinder 11 does not remain fully operative, and the brake unit 10 becomes at least partially engaged. This is undesirable for the reason that it either wholly stops the vehicle, or causes a jerking motion during its travel.

To overcome this difficulty, and to facilitate clutch changing while the vehicle is in operation, the system incorporates the following:

A normally open fluid pressure metering valve 13 is interposed in the pressure feed conduit 5 between the reservoir 6 and the valve 3; the valve 13 being controlled by a foot pedal 14 accessible to the operator of the vehicle.

The valve 13 includes, for example, a plunger 15 movable with respect to the porting of the valve from a normal position establishing communication between the two portions of the conduit 5 to another position blocking the lead portion of such conduit and venting the portion which connects with the valve 3. The plunger 15 is maintained in said normal position, and the foot pedal 14 is normally held raised, by a suitable spring means 16.

When the operator of the vehicle desires to manipulate the four-way valve 3 to change clutches, the foot pedal 14 is first depressed, shifting the plunger 15 to a position blocking the lead portion of the conduit 5 against pressure flow therein from the reservoir, and at the same time venting the portion of the conduit 5 which connects with said valve 3. Thereafter the valve 3 can be manipulated to any desired position without causing any pressure drop in the reservoir 6 or any adverse effect on the power cylinder 11 which normally maintains the brake unit 10 released.

After the valve 3 is manipulated to the proper position for the desired clutch change, the foot pedal 14 is permitted to raise, whereupon fluid pressure again flows through the conduit 5, through the valve 3, and to the selected clutch 2. As the valve 13 is of metering type this can be accomplished without any appreciable pressure drop in the reservoir 6; the compressor 7, driven from the vehicle engine, being able to provide suitable compensation for fluid pressure consumption then occurring.

By interposing the valve 13 in the system in the manner described, the foot pedal 14 can also be used by the operator in exactly the same manner as the clutch pedal of a conventional vehicle; functioning here, however, to cut off the fluid pressure supply to the operative clutches, rather than any mechanical disengagement.

This results in the ability to better control the machine in starting, or in close quarters; as well as facilitating clutch changing, as previously described.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A fluid pressure control system for a vehicle having a transmission including fluid pressure controlled clutches, and a brake normally fluid pressure released; said system comprising a fluid pressure source, a clutch control valve operatively connected to the clutches of the transmission in selective actuating relation, a fluid pressure supply conduit between said source and valve, another fluid pressure supply conduit between said source and the brake, and normally open valve means arranged to meter the fluid flow in a clutch engaging direction and close said first named conduit preparatory to operation of the clutch control valve, so as to prevent fluid pressure drop at said source and at the brake upon clutch changing.

2. A fluid pressure control system for a vehicle having a transmission including fluid pressure controlled clutches, and a device normally fluid pressure released; said system comprising a fluid pressure source, a clutch control valve operatively connected to the clutches of the transmission in selective actuating relation, a fluid pressure supply conduit between said source and valve, another fluid pressure supply conduit between said source and device, and normally open valve means arranged to meter the fluid flow in a clutch engaging direction and close said first named conduit preparatory to operation of the clutch control valve, so as to prevent fluid pressure drop at said source and in said device upon clutch changing; said device being a fluid pressure disengaged brake unit of the vehicle.

3. A fluid pressure control system for a vehicle having a transmission including fluid pressure controlled clutches, and a brake normally fluid pressure released; said system comprising a fluid pressure source, a clutch control valve operatively connected to the clutches of the transmission in selective actuating relation, a fluid pressure supply conduit between said source and valve, another fluid pressure supply conduit between said source and the brake, and normally open valve means arranged to close said first named conduit preparatory to operation of the clutch control valve, so as to prevent fluid pressure drop at said source and at the brake upon clutch changing; said normally open valve means being a valve interposed in said first named conduit and metering the fluid flow in a clutch engaging direction.

4. A fluid pressure control system for a vehicle having a transmission including fluid pressure controlled clutches, and a brake normally fluid pressure released; said system comprising a fluid pressure source, a clutch control valve operatively connected to the clutches of the transmission in selective actuating relation, a fluid pressure supply conduit between said source and valve, another fluid pressure supply conduit between said source and the brake, and normally open valve means arranged to meter the fluid flow in a clutch engaging direction and close said first named conduit preparatory to operation of the clutch control valve, so as to prevent fluid pressure drop at said source and at the brake upon clutch changing; said normally open valve means being a valve interposed in said first named conduit, said valve, when closed, venting the portion of said first named conduit between the valves.

5. A fluid pressure control system for a vehicle having a transmission including fluid pressure controlled clutches, and a device normally fluid pressure released; said system comprising a fluid pressure source, a clutch control valve operatively connected to the clutches of the transmission in selective actuating relation, a fluid pressure supply conduit between said source and valve, another fluid pressure supply conduit between said source and device, said device being a fluid pressure disengaged brake unit of the vehicle, and a separate, normally open valve interposed in said first named conduit arranged to meter the fluid flow in a clutch engaging direction and to close said conduit preparatory to operation of the clutch control valve, so as to prevent fluid pressure drop at said source and in said brake unit upon clutch changing.

6. A fluid pressure control system for a vehicle having a transmission including fluid pressure controlled clutches, and a device normally fluid pressure released; said system comprising a fluid pressure source, a clutch control valve operatively connected to the clutches of the transmission in selective actuating relation, a fluid pressure supply conduit between said source and valve, another fluid pressure supply conduit between said source and device, said device being a fluid pressure disengaged brake unit of the vehicle, and a separate, normally open valve interposed in said first named conduit arranged to meter the fluid flow in a clutch engaging direction and to close said conduit preparatory to operation of the clutch control valve, so as to prevent fluid pressure drop at said source and in said brake unit upon clutch changing; said separate valve being foot pedal actuated.

ROBERT G. LE TOURNEAU.

REFERENCES CITED

The following references are of record in the file of this patent:

UNITED STATES PATENTS

| Number | Name | Date |
| --- | --- | --- |
| 1,045,918 | Viele | Dec. 3, 1912 |
| 2,286,873 | Schwartz | June 16, 1942 |
| 2,433,443 | Edge | Dec. 30, 1947 |